United States Patent [19]

Maytham

[11] 4,370,808

[45] Feb. 1, 1983

[54] CUTTING TOOL WITH WEDGE SHAPED CUTTING BLADE TO REDUCE FRICTION

[75] Inventor: Walter J. Maytham, Los Altos, Calif.

[73] Assignee: Speed Systems, Inc., Waukesha, Wis.

[21] Appl. No.: 192,072

[22] Filed: Sep. 29, 1980

[51] Int. Cl.³ .............................................. H02G 1/12
[52] U.S. Cl. ...................................... 30/353; 30/90.1;
81/9.5 R
[58] Field of Search ................ 81/9.5 R, 9.5 A, 9.5 B, 81/9.5 C; 30/90.1, 346, 353

[56] References Cited

U.S. PATENT DOCUMENTS 3,620,104 11/1971 Horrocks ............................ 81/9.5 C
3,820,420 6/1974 Matthews ........................... 81/9.5 R
3,869,791 3/1975 Horrocks .............................. 30/90.1
3,978,582 9/1976 Maytham ............................. 30/90.1

Primary Examiner—Jimmy C. Peters
Attorney, Agent, or Firm—Alan H. MacPherson; Steven F. Caserza; Richard Franklin

[57] ABSTRACT

A cutting tool for stripping insulation from a cable comprises a shank and a blade, the blade possessing one cutting edge formed at the intersection of a back face and a front face, the front face being concave, and the back and front faces together forming a wedge. In one embodiment, an additional wedge-shaped protuberance is formed out of the front face of the blade at its end substantially perpendicular to the back face of the blade to assist in wedging the insulation being removed from the cable.

6 Claims, 12 Drawing Figures

CUTTING TOOL WITH WEDGE SHAPED CUTTING BLADE TO REDUCE FRICTION

BACKGROUND OF THE INVENTION

1. Field of the Invention

This invention relates to cutting tools and particularly to a cutting tool for stripping the insulation from electrical cables.

2. Description of the Prior Art

Cable stripping tools are well known. See for example U.S. Pat. No. 3,665,603 issued May 30, 1972 on an invention of Bilbrey and Van Gelder for a description of a cable stripping tool widely used commercially. Blades for use in cable stripping tools are disclosed in, for example, U.S. Pat. Nos. 3,398,610 and 3,820,420 both on applications filed by Matthews. Similarly, Wolf in U.S. Pat. No. 3,354,762 discloses a tool described as being particularly useful for stripping hose covering. One feature of each of the prior art tools disclosed in the '610, '420 and '762 patents is that the blade in each tool contains two cutting edges, one cutting edge being located in a plane substantially perpendicular to the plane at which the other cutting edge is located. U.S. Design Pat. No. 229,886 issued Jan. 15, 1974 on an invention of Maytham discloses a distinctly different cutting tool with one cutting edge and one wedge, wherein the leading edge of the wedge is offset from the cutting edge, such that straight lines drawn along and beyond the two edges do not intersect.

The dual edged cutting tools of the prior art have one characteristic in common: they are relatively expensive to manufacture.

SUMMARY OF THE INVENTION

In accordance with this invention a single edged cutting tool is provided that is particularly useful for stripping insulation from electrical cables. The tool of this invention uses only one cutting edge on a blade appropriately shaped so as to "wedge" the insulation out of and away from the strands of cable while at the same time having a bottom end properly sloped so as not to cut or nick the underlying electrical cable. In one embodiment, one face of the wedge-shaped blade is carefully contoured to minimize the sliding friction of the insulation being removed past the blade, thereby reducing the force necessary to rotate the blade around the cable.

In accordance with this invention, a cutting blade suitable for use in a cable stripping tool comprises a cutting edge on a wedge shaped blade, one surface of which is concave thereby to minimize the sliding friction of the insulation past this surface. The bottom end of the blade is angled relative to the cutting edge to allow the edge to cut the insulation while the bottom end of the blade remains sufficiently close to the electrical cable to pry or wedge that portion of the insulation cut from the cable away from both the remaining insulation and the individual wire strands which make up the cable.

In accordance with an alternative embodiment of this invention, a wedge-shaped protuberance is formed on the blade substantially perpendicular to one face of the blade and so as to rise out of the front surface of the blade near the end of the blade. The wedge surface is formed substantially perpendicular to the back face of the blade and rises away from the end of the blade. The edge of the wedge is blunt faced and does not possess a cutting edge. The cutting edge of the blade is angled back relative to the shank of the cutting tool so that the bottom end of the cutting edge will be located directly over the intersection of a radius of a cross-section of the cable with the surface of the conductive portion of the cable (hereinafter referred to from time-to-time as the "top" of the cable).

This invention will be understood in conjunction with the following detailed description taken together with the attached drawings.

DETAILED DESCRIPTION OF THE DRAWING

DETAILED DESCRIPTION OF THE INVENTION

Figure 1:
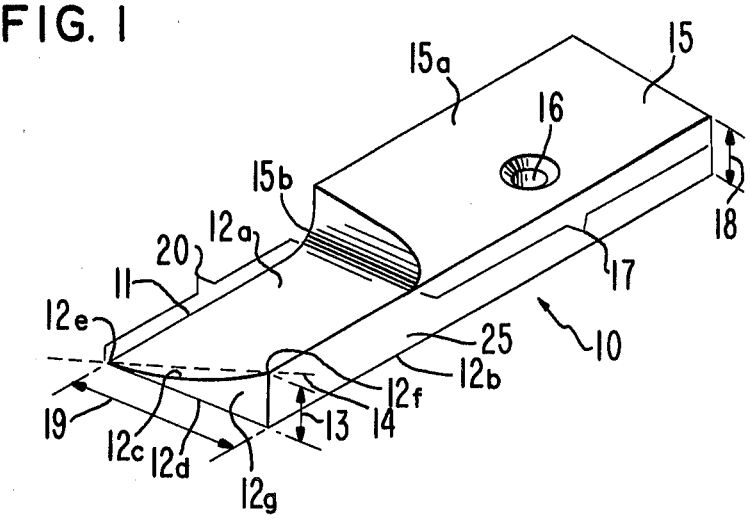
FIG. 1 shows an isometric view of one tool in accordance with this invention.

This description will be described in conjunction with the specific tools shown in the drawings. However, it should be understood that the principles of this invention are broadly applicable to a variety of tools for use in stripping insulation from a variety of products such as electrical cables, hoses or other similar structures.

As shown in FIG. 1, the tool 10 consists of two portions, a shank 17 in which is placed a mounting hole 16 for receipt of a screw or other structure for holding the shank firmly in a socket, and a blade portion 20. Hole 16 can, if desired, be replaced by a slot, thereby to allow tool 10 to be adjusted for optimum cutting. Blade 20 includes a cutting edge 11 and a front or lifting face 12a and back face 12b. Front face 12a is shown to be concave such that edge 12c at the intersection of bottom face 12g and front face 12a is concave with respect to straight line 14 touching the two corners 12e and 12f of face 12a. The rear face 25 of blade 20 has a thickness 13 selected to give the desired amount of wedge action to the blade. Typically, this thickness is selected such that the angle between straight line 14 and edge 12d at the intersection of back face 12b and bottom face 12g is approximately 10 degrees to 20 degrees. The optimum wedge angle represents a balance between the need to force the insulation out of the depressions between each of the wire strands making up the cable, and keeping to a reasonable level the force necessary to rotate the tool around the cable. In one embodiment, this angle was about 14 degrees. The thickness 18 of shank portion 17 can be selected as desired to fit whatever holder or socket is appropriate.

The concavity of face 12a provides a distinct advantage to the tool of this invention over prior art tools by reducing the amount of surface 12a which the insulation being removed from the cable or other structure contacts. The smaller this area, the less the sliding friction of the insulation past the blade. Accordingly, by insuring that the insulation being removed contacts the blade 12a only at the edge 11 and the intersection of the face 12a with rear face 25 (which intersection terminates in corner 12f), the sliding friction is significantly reduced over that experienced using prior art blades. The natural wedge shape of the blade (trailing edge 25 is the rear of the wedge) therefore prys that insulation which has been cut by the blade away from the underlying wire strands of the wire cable and thus cleanly separates the insulation from the cable. The simple construction of the blade greatly reduces the cost of the blade relative to prior art blades and, surprisingly, contrary to the teachings of the prior art and particularly of the Matthews patents cited above, provides an effective insulation stripping tool without the use of a second cutting blade previously taught as necessary by Matthews.

Figure 2:
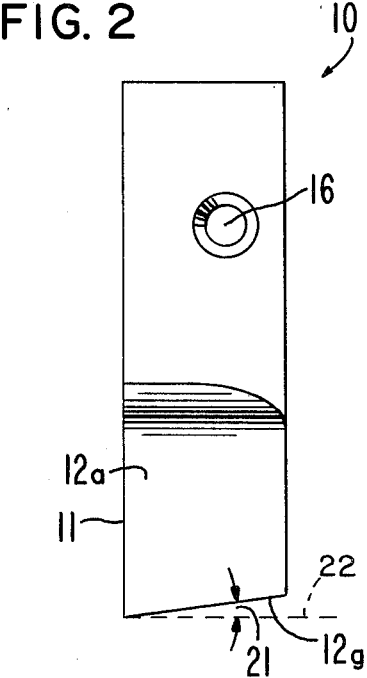
FIG. 2 shows a side view of the tool of FIG. 1 constructed in accordance with this invention.
Figure 3:
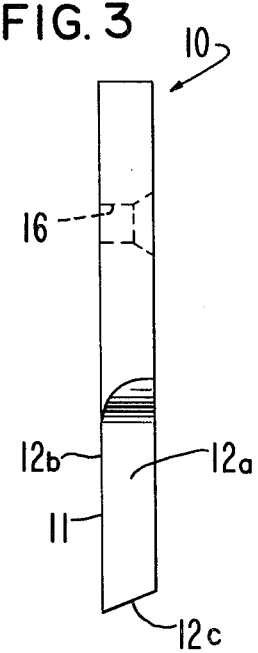
FIG. 3 shows the front view of the blade shown in FIGS. 1 and 2.
Figures 5A, 5B:
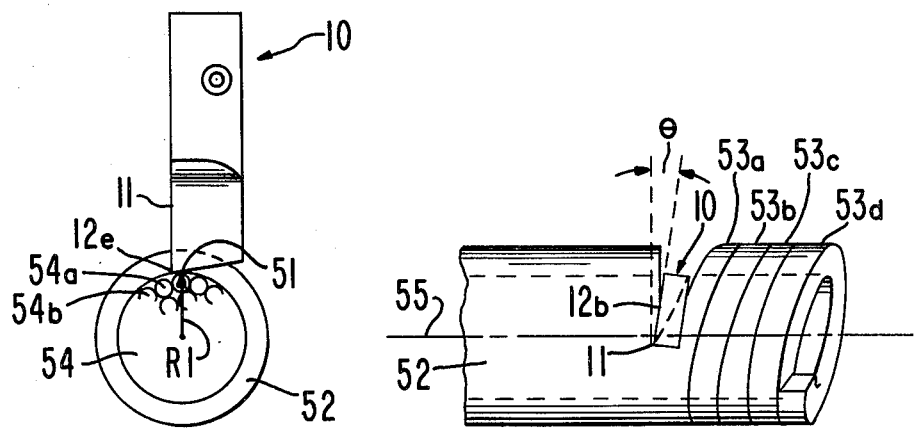
FIGS. 5a and 5b show the relationship of the cutting tool shown in FIGS. 1, 2 and 3 to an electrical cable whose insulation is being stripped.

FIG. 2 shows the side of the blade shown isometrically in FIG. 1. As can be seen from FIG. 2 the bottom face 12g of blade 20 makes an angle 21 with a straight line 22 perpendicular to cutting edge 11. In one embodiment, this angle is selected such that the bottom face 12g of the blade 20 clears and doesn't contact the conductor portion 54 of the cable as shown in FIG. 5a, but allows the blade 11 to cut closely to the conductive metal 54, and at the same time not nick conductor 54. In this embodiment, the plane of the bottom face 12g makes an acute angle with cutting edge 11. In another embodiment, the plane of the bottom face 12g makes an obtuse angle with edge 11, allowing the cutting edge 11 to be oriented above or slightly to the right of the top most portion 51 of the cable (FIG. 5a). In still another embodiment the plane of bottom face 12g is substantially perpendicular to cutting edge 11. The proper angle 21 (FIG. 2) depends on the relative sizes of the cable whose insulation is being stripped and the blade 20 and the desired location of edge 11 relative to top point 51 of cable 54.

Figure 7:
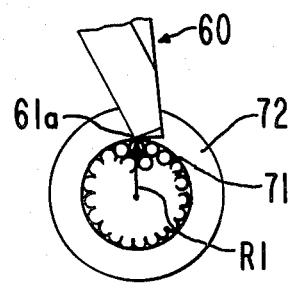
FIG. 7 illustrates the cutting tool of this invention located adjacent to a cable, the insulation of which is being stripped using the tool of this invention.

Typically, the insulation on a cable consists of at least two portions; a thin annular coating 71 (known as the "semiconducting conductor shield") which fills the interstitial spaces between the strands which make up the cable and the outer insulation 72. FIG. 7 shows the thin annular coating 71 and the outer insulation 72.

As seen in FIG. 5a where tool 10 is shown positioned relative to cable 54 containing on its outer surface insulation 52, the cutting edge 11 is positioned relative to the radius R1 from the center to top-most portion 51 of the cable such that R1 is either an extension of or parallel to, and offset slightly from edge 11. Edge 11 is such that a portion of bottom face 12g of tool 10 is slightly above but over point 51 such that point 12e of cutting edge 11 is also positioned slightly away from the cable but sufficiently close to the cable so as to be able to cut effectively insulation 52 and simultaneously wedge insulation 52 away from the remaining insulation as the blade 10 is rotated about the cable. FIG. 5b shows a top view of blade 10 oriented such that the back face 12b of blade 10 makes the angle $\theta$ with a plane perpendicular to the center line 55 of the cable. The cutting edge 11 penetrates insulation 52 while the wedge-shaped relationship of front surface 12a to back surface 12b causes the insulation as cut to be wedged out of and away from the surface of insulation 52 exposed by blade 10. Thus, insulation portions 53a, 53b, 53c and 53d form a continuous spiral of cut insulation of substantially uniform width around the core of cable 54.

A tool holder appropriate for holding the cutting blade 10 while stripping insulation, could, for example, comprise one of the type disclosed in the above cited Bilbrey patent or any other structure for attaching a blade to a tool and rotating the blade around a cable.

Figure 4:
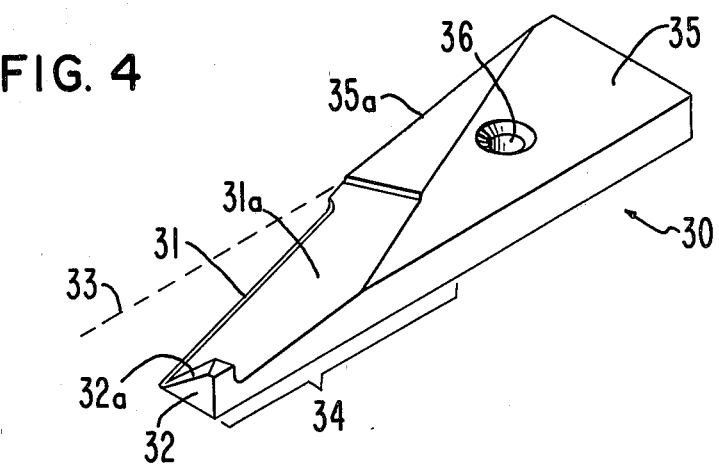
FIG. 4 shows an isometric view of another blade constructed in accordance with this invention.

FIG. 4 shows an alternative embodiment of this invention wherein cutting edge 31 is formed so as to give blade 34 a taper. Blade 34 terminates with a wedge-shaped portion 32 and cutting edge 31 is formed so as to make an acute angle with line 33 which is a straight extension of edge 35a of shank 35. The actual wedging action comes primarily from wedge-shaped portion 32. The small surface 32a of wedge 32 reduces substantially the friction associated with the rubbing of the cut insulation against the face 31a of the cutting blade. Tool 30 contains an opening 36 in the shank 35 for securing the blade in a cutting tool.

The tool of this invention as shown in FIG. 1 is made from tool steel and typically in one embodiment comprises a piece of tool steel one-half inch wide, three sixteenths inch thick and about one and seven-eighths inches long. While A-2 tool steel was used in a blade actually constructed, any appropriate tool steel is capable of being used for this blade. Both the front face and the back face of the blade were ground flat. The grinding wheel (typically about four to five inches in diameter) was then set so that the angle from the cutting edge 11 to the rear face 25 of the wedge was about 14 degrees. This angle typically can be anywhere from ten degrees to twenty degrees. The work piece was positioned on the table to obtain two concave surfaces: the first concave surface is the front face 12a of the wedge-shaped blade terminating in the edge 11 of the cutting tool. The second curvature 15b terminates in the top plane 15a of the shank of the tool to relieve any sharp corners so that the blade will not break from the shank. The shank then can be ground to fit any appropriate tool holder. The wedge typically ranges at its back 25 from one-eighth inch to five sixteenths inch thick depending upon the size of the blade. Of course, any appropriate wedge dimension can be used depending upon needs.

The cutting blade is heat treated to a desired hardness, typically 44 to 47 Rockwell. After heat treatment, the tool is subjected to a finishing grind to remove the carbonized skin.

Figure 6A:
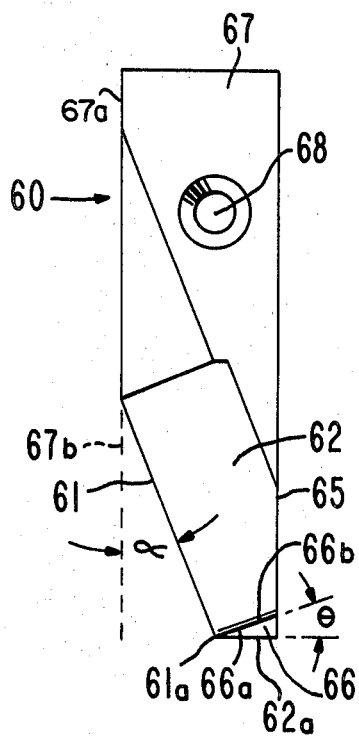
FIGS. 6a and 6b illustrate an alternative embodiment of this invention using a single cutting edge and a wedging edge.
Figure 6B:
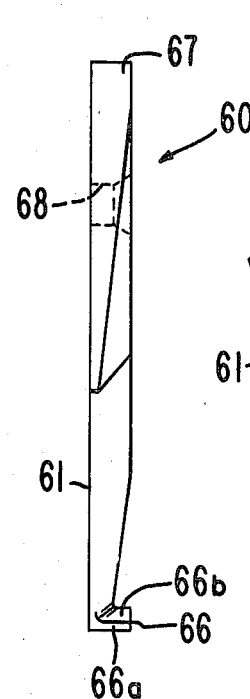
Figure 6C:
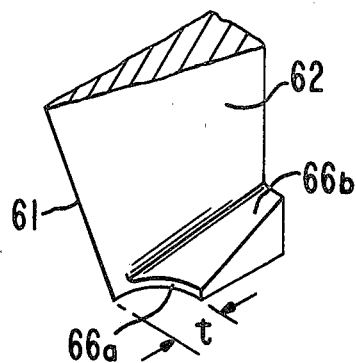
FIG. 6c shows an isometric view of the relationship of the cutting edge to the wedging edge of the tool of FIGS. 6a and 6b.

An alternative embodiment of the tool of this invention is shown in FIGS. 6a and 6b comprising side and end views of this tool. The tool 60 shown in FIGS. 6a and 6b contains a cutting edge 61 on one edge of blade 62. Edge 61 is angled back from the line 67b comprising an extension of the left edge 67a of the shank 67 of the tool by the angle "α". Typically, α is selected such that point 61a comprising the intersection of edge 61 with the bottom of the blade lies just over the top of the cable the insulation on which is being stripped. Wedge-shaped protuberance 66 extends out from blade 62 at the bottom end of blade 62. Protuberance 66 has edge 66a (FIG. 6c) which is a blunt face. Protuberance 66 thus comprises a blunt-faced breaking wedge which wedges the insulating material surrounding the cable out from the interstitial regions between the wire strands making up the cable without, at the same time, allowing the tool to touch and therefore scar or cut this cable. Typically, the insulation surrounding a cable includes a small amount of material between the insulation and the conducting portion of the cable. This small amount of material arranged annularly around the metal cable is called a "semiconducting conductor shield". This semiconductor conducting shield must be lifted out from the interstitial voids between the metal strands which make up the cable. Wedge 66 does this. Edge 66a of wedge 66 is blunt-faced and not sharp. Thus, edge 66a does not cut the insulation but rather merely prys the semiconducting conductor shield from the cable while leaving this portion 71 (FIG. 7) of the insulation attached to the main body 72 of insulation being stripped from the cable.

FIG. 7 illustrates the orientation of cutting tool 60 when mounted in a tool holder. As shown in FIG. 7, edge 61a is mounted just above the conductive cable such that 61a is at the end of a radius R1 to the surface of the cable from the center of the cable.

The angle "θ" (FIG. 6a) between the top surface 66b of wedge 66 and the bottom surface 62a was in one embodiment about 17°, although any other appropriate angle can, if desired, be used.

Figure 8A:
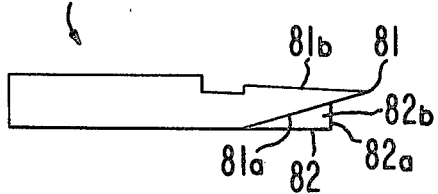
FIGS. 8a and 8b show another alternative embodiment of this invention employing a wedge-shaped protuberance.
Figure 8B:
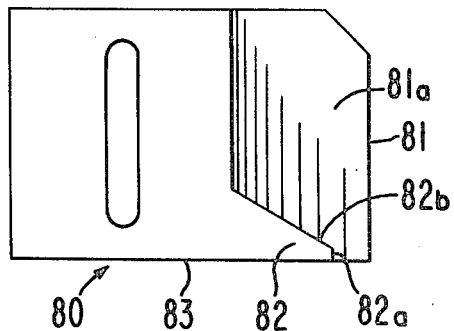

FIGS. 8a and 8b show top and side views respectively, of another alternative embodiment of this invention. Blade 80 possesses cutting edge 81 with concave front face 81a and back face 81b. Protuberance 82 contains a face 82a angled at a substantially greater angle to back face 81b than is front face 81a. Surface 82b of protuberance 82 also forms an acute angle with bottom 83 of cutting tool 80. Thus surfaces 82a and 82b both form wedging surfaces which assist in removing the insulation from the interstitial spaces between the cable strands.

While several embodiments of the cutting blade of this invention have been described above, other embodiments of this cutting blade will be apparent to those skilled in the art in view of this description.

I claim:

1. A cutting blade for use in stripping insulation from a cable made up of conductive strands of material, said cutting blade having a front face, a rear face, a cutting edge formed at the intersection of said front face and said rear face an end and a wedge-shaped block of material formed at said end such that the wedge-shaped block of material extends at right angles from said front face, said wedge having a blunt face facing in the same direction as said cutting edge said cutting edge being adapted to cut a portion of the insulation in a helix around the axis of said cable when said blade is rotated about said cable but to leave uncut a small portion of insulation adjacent said conductive strands, said wedge being adapted to lift the uncut insulation beneath the cut insulation from said cable.

2. Structure as in claim 1 wherein the blunt face of said wedge is recessed back from the cutting edge of the blade such that said blunt face does not intersect the cutting edge of said blade.

3. Structure as in claim 2 wherein said blunt face is at the end of an inclined surface forming a selected acute angle with the end of said blade, said inclined surface being substantially perpendicular to said front face.

4. Structure as in claim 1 wherein said wedge-shaped block of material has a bottom surface coplanar with the surface of said end of said cutting blade, and a lifting surface extending from said blunt face and forming an acute angle with said bottom surface such that said lifting surface lifts the uncut insulation cut by said cutting edge away from said cable.

5. Structure as in claim 1 wherein said blunt face of said wedge-shaped block of material rises from said front face of said blade so as to pry away from said front face the insulation cut from said cable.

6. Structure as in claim 1 wherein said blunt face is curved.

* * * * *

UNITED STATES PATENT AND TRADEMARK OFFICE
CERTIFICATE OF CORRECTION

PATENT NO. : 4,370,808

DATED : February 1, 1983

INVENTOR(S) : Walter J. Matham

It is certified that error appears in the above—identified patent and that said Letters Patent is hereby corrected as shown below:

In column 6, line 6, delete "rear" and insert --back--;

In column 6, line 8, delete "rear" and insert --back--;

In column 6, line 32, after "insulation" insert --beneath the cut insulation--.

Signed and Sealed this

Thirtieth Day of October 1984

[SEAL]

Attest:

GERALD J. MOSSINGHOFF

Attesting Officer

Commissioner of Patents and Trademarks